United States Patent
Russell-Maynard et al.

(10) Patent No.: US 6,904,870 B2
(45) Date of Patent: Jun. 14, 2005

(54) PRODUCTS AND METHODS FOR IMPROVING ANIMAL DENTAL HYGIENE

(75) Inventors: John Russell-Maynard, Amiens (FR); Christophe Dautremont, Oye et Pallet (FR); El Marima, Saint-Cyr-l'Ecole (FR); Paulo Fernandes, Amiens (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/473,565

(22) PCT Filed: Mar. 26, 2002

(86) PCT No.: PCT/EP02/03430

§ 371 (c)(1),
(2), (4) Date: Sep. 29, 2003

(87) PCT Pub. No.: WO02/078432

PCT Pub. Date: Oct. 10, 2002

(65) Prior Publication Data

US 2004/0099224 A1 May 27, 2004

Related U.S. Application Data (60) Provisional application No. 60/280,064, filed on Mar. 30, 2001.

(51) Int. Cl.[7] .............................................. A01K 29/00
(52) U.S. Cl. ....................................... 119/709; 119/710
(58) Field of Search ............................... 119/709, 710; 433/216; 510/160

(56) References Cited

U.S. PATENT DOCUMENTS

| | | | | |
|---|---|---|---|---|
| 5,339,771 A | * | 8/1994 | Axelrod | 119/710 |
| 5,419,283 A | * | 5/1995 | Leo | 119/709 |
| 5,485,809 A | * | 1/1996 | Carroll | 119/710 |
| 5,797,353 A | * | 8/1998 | Leopold | 119/710 |
| 5,941,197 A | * | 8/1999 | Axelrod | 119/710 |
| 6,110,521 A | | 8/2000 | Axelrod | 119/710 |
| 6,116,191 A | * | 9/2000 | Suchowski et al. | 119/709 |
| 6,202,598 B1 | | 3/2001 | Willinger | |
| 6,360,696 B1 | * | 3/2002 | Arnold et al. | 119/710 |
| 6,672,252 B2 | * | 1/2004 | Levin et al. | 119/709 |

FOREIGN PATENT DOCUMENTS

| | | |
|---|---|---|
| EP | 0 552 897 A1 | 7/1993 |
| WO | WO 98/47392 | 10/1998 |
| WO | WO 00/13521 | 3/2000 |

* cited by examiner

Primary Examiner—Teri Pham Luu
Assistant Examiner—Elizabeth Shaw
(74) Attorney, Agent, or Firm—Bell, Boyd & Lloyd LLC (57) ABSTRACT

Products and methods for reducing tartar on the teeth of a pet are provided. In an embodiment, a chewable product that enhances dental hygiene in a pet is provided comprising a body having a continuous phase and a discontinuous phase in such a proportion so that the force required to penetrate the product is greater than an anticipated bite force exerted by the pet during a normal biting event, and below the maximum force that the pet may periodically exert.

8 Claims, 2 Drawing Sheets

PRODUCTS AND METHODS FOR IMPROVING ANIMAL DENTAL HYGIENE

This application claims the benefit of Provisional Application No. 60/280,064, filed Mar. 30, 2001.

BACKGROUND OF THE INVENTION

The present invention generally relates to dental hygiene. More specifically, the present invention relates to improving the dental hygiene of pets. It relates also a polymer composition having a continuous phase and a discontinuous phase, and which may find application in improving pet dental hygiene.

It is of course known that there are many different products for improving the health and well-being of animals, especially pets. These products run a vast array including products designed to improve dental hygiene in pets.

It is known that poor dental health is very common in animals, including pets such as dogs and cats. Poor dental hygiene can result in periodontal disease. Periodontal disease is one of the most commonly treated disease by veterinarians in the United States.

The long term impact of poor dental health can be devastating to an animal. Poor dental health is thought to be a contributing factor in the deaths of dogs, cats, and other manuals. In pets, it has been linked with serious diseases of the heart, liver, kidney, and other internal organs. Indeed, one study demonstrated that every dog with periodontal disease had pathological changes in the heart, liver, and kidneys.

Most periodontal disease starts with the formation of a film of a soft amorphous material called plaque, consisting primarily of oral bacteria, bacterial byproducts, and oral debris. This film typically covers both the exposed tooth surface and the area lying under the gum line, the gingival cavity. Through the deposition of calcium and other mineral salts, this layer of plaque hardens and develops into tartar. Although tartar is hard, it is also porous and adheres to the tooth surface. It appears to be progressively deposited in layers and provides a rough surface onto which more plaque is deposited. As tartar builds up, a broad range of microbes can attach. The byproducts of metabolism from these bacteria cause inflammation of local tissues including those surrounding the gingival cavity. This ultimately leads to periodontal disease. The earliest stage is gingivitis, characterized by inflammation of the gums. As periodontal disease progresses, gingivitis becomes periodontitis, with inflammation extending into the connective tissues surrounding the tooth. Through gingivitis and periodontitis, it is thought that harmful bacteria enter into the blood stream and ultimately lodge in the heart and other internal organs.

It has been found that the sides of the teeth facing the cheeks, i.e. located in the buccal cavity, have a greater incidence of gingivitis and plaque/tartar build-up than the sides of the teeth facing the tongue, i.e., the lingual side. It has also been found that the rear teeth, i.e., the pre-molars and molars; more rapidly develop plaque and tartar than the front teeth.

A variety of development efforts have focused on cleaning teeth and improving dental hygiene in animals. One simple method for removing plaque in pets is for the pet owner to brush his pet's teeth regularly. Unfortunately, few pet owners are willing or able to maintain this level of home care.

Therefore, efforts have focused on providing products that clean the teeth of pets while being chewed. There are a number of such products that claim to help clean the teeth of pets. However, few are totally effective and many suffer from a variety of disadvantages.

One of the problems of such products is that some of them are not edible. Hence, once the products are chewed or broken up by the pets and swallowed they cause digestive problems in the animals. Another problem with some products is that they have limited efficacy in cleaning the molars and pre-molars. These are the teeth where typically tartar build up is heaviest and also which are the most difficult teeth for an owner to clean with a toothbrush.

Further, many such products do not always clean the crevices of these teeth. Moreover, many such products are ineffective in cleaning the areas underneath the gums. Still further, many such products are not effective in promoting cleaning of the surfaces of the teeth that are located in the rear of the buccal cavity. If the product is poorly designed, then, during chewing, little of the product will actually enter the rear buccal cavity, thus leading to reduced abrasive action and limited cleaning of the tooth surface.

A further problem is that many of these products are ineffective in removing existing tartar. Because tartar is so hard, attempting to remove tartar by the simple abrading action caused by chewing may not be effective in reducing the tartar.

Some such products have oral care additives that are designed to inhibit the formation of tartar. A problem with some of these products is that they do not necessarily function as desired. In this regard, the efficacy of these agents disappears when the product is swallowed or other food is eaten by the animal. In a similar vein, some of these products are unstable and their texture changes with time, losing their cleansing properties.

U.S. Pat. No. 6,110,521 describes a wheat and casein dog chew having a texture that can be modified by the dog minder by subjecting the chew to microwave radiation, causing expansion and rendering it more easy to chew. To enable the expansion under microwave heating, the product has to have a moisture content of 10% to 14% by weight.

PCT patent publication number WO 00/13521 describes a chewable toy for a pet that has a protein based thermoplastic composition and can be fashioned into the shape of a bone. Applicants believe that the products described therein have limited dental efficacy. The application suggests that simply producing a product that "mimics natural animal bone shapes" and which allows "pets to softly penetrate the chewable toy" promotes clean healthy teeth and fresh breath. But, such a product will not necessarily promote effective teeth cleaning, especially in the difficult areas such the rear teeth, e.g., the molars, under the gum lines and in the area opposite the cheeks, i.e., the buccal cavity. These are the areas where plaque accumulation can rapidly develop into gingivitis and pathogenic bacteria enter the blood stream with potentially harmful consequences.

European patent application number EP 0 552 897 A1 discloses an edible animal chew product with a flexible cellular matrix containing cellulosic fibers e.g. 20 to 50% corn cobs and oral care additives. However, a difficulty with the product of this disclosure is that corncob and such cellulosic materials are unnatural to a pet animal's diet and can contribute to diarrhea and increased fecal volume. This is the opposite of the desires of many owners, who prefer not to have increased fecal volume from their pets. Another disadvantage of the above products is that they rely on the teeth being initially cleaned by dental prophylaxis by a veterinarian. Few owners regularly have a veterinarian perform dental prophylaxis.

A common failure of the prior art is that it neglects the bite force exerted by the teeth and the biting behavior of the target animals. If the bite resistance is too high, then the teeth will not evenly penetrate the product and there will be little opportunity for the product to push against the gums and clean in critical areas. Conversely, if the bite resistance is too low then the dog will rapidly bite through the product and swallow the product. Thus, little pressure will be exerted against the tooth surface under the gums again leading to poor cleaning in critical areas.

There is therefore a need for improved products and methods for enhancing the dental hygiene of a pet.

SUMMARY OF THE INVENTION

The present invention provides a polymer composition having a continuous phase and a discontinuous phase, the discontinuous phase being distributed within the continuous phase, the said continuous phase being composed of at least one polymer of biological origin or a derivative or complex of such polymer.

The present invention further provides improved products for improving the dental hygiene of a pet. Additionally, the present invention provides improved methods for making products for enhancing the dental hygiene of a pet.

To this end, in a first aspect of the invention, there is provided a chewable product that enhances dental hygiene in a pet. The product comprises a body having a continuous phase and a discontinuous phase in such a proportion that the force required to penetrate the product is greater than an anticipated bite force exerted by a pet in a predetermined target group of pets during a normal biting event. Desirably, in addition, the required penetration force is, however, less than the maximum bite force typical of the said target group. The anticipated bite force is defined to be that of an average pet in the predetermined target group.

In an embodiment, the continuous phase is composed a polymer of biological origin or a derivative or complex thereof. In a further embodiment, it may additionally contain smaller solvating molecules, preservatives, anti-oxidants, crystallization retardants, inorganic ions, flavour molecules and other smaller compatible molecules and ions.

In an embodiment, the biologically originating polymer is chosen from the group consisting of: carbohydrates and/or derivatives of carbohydrates including polysaccharides; starches; polydextrans; all polymers and polysaccharides of or derived from naturally occurring hexose, pentose and heptose sugars and their derivatives; polysaccharides of microbial origin including those derived from fermentation of the above and below mentioned substances or by fermentation of any food based medium; hydrocolloids; hydrocolloids of microbial origin; hydrocolloids of plant origin; polyols; polyols of microbial origin; sugar alcohols; polymers of sugar alcohols; carbohydrates derived as by-products of or that are the wastes from human food processing; proteins and/or derivatives of proteins including glycoproteins, lipoproteins, phospho-proteins, tropocollagens, and derivatives/hydrolysates/complexes of tropocollagen; milk proteins and derivatives such as those present in the hydrophobic protein fraction of milk e.g. the caseinates; those polymers present in milk solids; milk solids and derivatives; proteins derived from eggs; proteins from or derived from meat and the wastes associated with slaughtering and meat processing; proteins derived as by-products of or the wastes from human food processing; polypeptides; plant proteins; proteins of microbial origin; animal proteins; polymers of microbial cell wall origin; polymers of microbial cellular origin; polymers containing a combination of protein and carbohydrate monomers or that are formed by combining carbohydrate and proteinaeous material; polymers containing a combination of lipid and/or protein and/or carbohydrate monomers or that are formed by combining lipid and/or protein and/or carbohydrate elements to form a new polymer or complex of polymers; all other polymers of biological origin or derived from those of biological origin that exhibit the desired functional properties apparent in the above mentioned polymers.

In an embodiment, the discontinuous phase is composed of: micro-occlusions/microscopic particles of all non-reactive/insoluble organic/biological substances with melting points and/or glass transition points above room temperature and as well those with melting and/or glass transition points below room temperature that are not soluble in the continuous phase, occlusions/particles of all non-reactive/insoluble organic/biological substances with melting points and/or glass transition points above room temperature and as well those with melting and/or glass transition points below room temperature that are not soluble in the continuous phase, non-active inorganic substances that are compatible with and do not react or significantly interact with the substances present in the continuous phase, carbohydrates and/or derivatives of carbohydrates including saccharides, sugars, polysaccharides, ungelatinized starches, starches and/or derivatives, inulin, polyfructans, polydektrans; all polymers of the naturally occurring hexose, pentose and heptose sugars and their derivatives, cellulose and polymers derived from cellulose, amino-polysaccharides such as chitin, chitosan and polymers derived from these substances, oligiosaccharides, polysaccharides of and derivatives of polysaccharides of microbial origin, polyols, polyols of microbial origin, sugar alcohols, polymers of sugar alcohols, mineral oxides, inorganic and organic oxides, phosphates, sulphates, carbonates and other insoluble salts or covalently bonded inorganic substances, polymers of or mixtures/complexes and combinations of all of the aforementioned inorganic: and organic substances, aluminosilicates, silicates, inorganic substances common in soils, clays, minerals, metals and substances derived from the metals, bone, cartilage, oils, fats, gases, petroleum derivatives and petroleum based polymers, micro-occlusions/particles of microbial origin, intact non-viable microbes, dry intact non-viable microbes, the shells and cell wall material derived from dead microbes, material of microbial origin, micro-occlusions/particles of plant origin, material of plant origin, micro-occlusions/particles of animal origin, material of animal origin; such polymers and substances of biological origin as are also present as components of the continuous phase, being present in the discontinuous phase in a different state to their state in the continuous phase.

In an embodiment, the polymers and substances of biological origin, as are present as components of both the continuous phase and the discontinuous phase, are present in the discontinuous phase predominately in the glassy or crystalline state.

In an embodiment, the polymers and substances of biological origin as are also present as components of both the continuous phase and the discontinuous phase, are present predominately in the rubber state. Preferably, the components common to both states are present in the discontinuous phase as dispersed, relatively small and discrete particles.

In an embodiment, the product is in the shape of a bone.

In an embodiment, the product is in the shape of a flat bone.

In an embodiment, the product is in the shape of a flat long rectangular box or any shape that when drawn fits in such a box and touches each of the surfaces of such a box.

In a preferred form of the invention, there is thus provided a product for cleaning teeth of a pet, the product being chewable and having a continuous phase and a discontinuous phase in a proportion so that the force required to penetrate the product is greater than an anticipated bite force exerted by the pet, and wherein, after an initial bite by the pet, at least a portion of the surface bitten by the pet springs back to substantially its original shape.

In a second aspect of the present invention, a method for providing dental hygiene to a pet is provided. The method comprises the steps of providing a pet with a chewable product that includes a continuous and a discontinuous phase and selecting the relationship of the continuous to discontinuous phase so that the force required to penetrate the product is, greater than an anticipated initial bite force of the pet during a normal biting event, causing the product after an initial bite to spring back to at least almost its original shape. The relationship of the phases may be in regard to composition or proportion in the product. In a preferred form of the invention, the continuous phase is predominantly in the rubber state and the discontinuous phase is predominantly in the crystalline or glassy state.

In a further aspect of the present invention, a method for making a chewable product for enhancing dental hygiene is provided. The method comprises the steps of: producing a chewable, edible product that includes a continuous and a discontinuous phase; and selecting the relationship of the continuous to discontinuous phase so that the force required to penetrate the product is greater than an anticipated initial bite force of the pet during a normal biting event, causing the product after an initial bite to spring back to at least almost its original shape. In a preferred form of the method of manufacture, the continuous phase is formed in the rubber state.

The invention extends also to a method of maintaining or improving the condition of a pet, the method including the step of facilitating the removal of tartar from the pet's teeth so as to improve or maintain the oral health of the pet.

It is an advantage of the present invention to provide a product for improving the dental health of a pet and thereby its general condition.

Another advantage of the present invention is to provide an improved method for enhancing the dental hygiene of an animal, especially a pet such as a cat or a dog.

Still further, an advantage of the present invention is to provide improved methods for removing plaque from the teeth of a pet and inhibiting the buildup of tartar on the teeth.

Additionally, an advantage of the present invention is to provide a product that retards tartar buildup on the teeth of pets.

Additional features and advantages of the present invention will be described in and apparent from the detailed description of the presently preferred embodiments and the figures.

DETAILED DESCRIPTION OF THE PRESENTLY PREFERRED EMBODIMENTS

The present invention provides a polymer composition having a continuous phase and a discontinuous phase, the discontinuous phase being distributed within the continuous phase, the said continuous phase being composed of polymers of biological origin or derivatives or complexes of such polymers. This composition may be applied in the manufacture of products that may be used in health related fields. The invention thus further relates generally to products and methods for improving the dental hygiene of a pet, in particular a dog or a cat. In part, the products and methods of the present invention are designed to reduce plaque and tartar formation and build-up on the teeth of a pet.

The invention further provides a method of maintaining or improving the health of a pet by inhibiting the spread of pathogens, having oral origin, from the mouth of the pet to other areas of its body, such as its vital organs. Through facilitating the removal of tartar from the pet's teeth, the accumulation, propagation and spread of such pathogens is inhibited. This is expected to have a beneficial effect on the general or overall health and condition of the pet. The method may include the step of administering to the pet a chewable body having a composition comprised of a continuous phase within which is dispersed a discontinuous phase. The body is preferably administered at regular intervals to the pet, the intervals being chosen to be sufficiently short to inhibit the formation or reformation of tartar on the pet's teeth. For example, the chewable body may be administered daily to provide an abrasive action when contacted with the pet's teeth, thereby facilitating tartar removal and inhibiting its regrowth or reformation.

Figure 1:
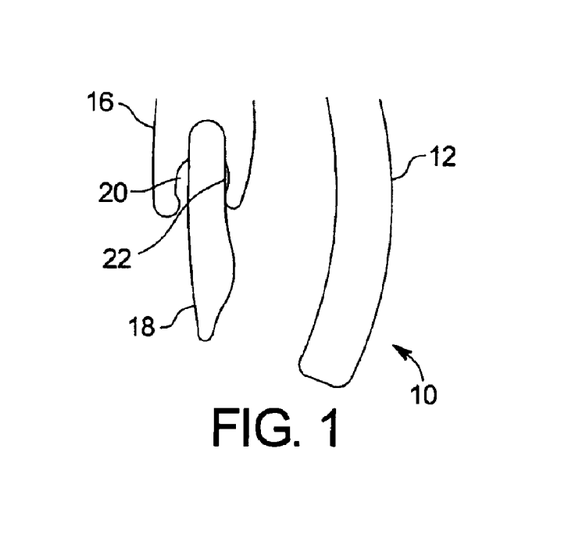
FIG. 1 illustrates a cross-sectional view of a pet's mouth.

Referring now to FIG. 1, generally the mouth 10 of a pet is illustrated. As illustrated, a typical pet's mouth 10 includes a tooth 12 that is located, in part, within the gums 14 of the pet. An area between the tooth 12 and gums 14 is defined by the gingival cavity 16.

As set forth above, tartar can form on the teeth 12 of the animal. Tartar can be difficult to remove, especially if it is located in the buccal cavity 18, the area located between the teeth 12 and the cheek 20 of the mouth. Additionally, it is difficult to remove tartar that is located in the gingival cavity 16. Unfortunately, it is the tartar located in the gingival cavity 16 that can be most detrimental to the health of a pet.

Figures 2, 3:
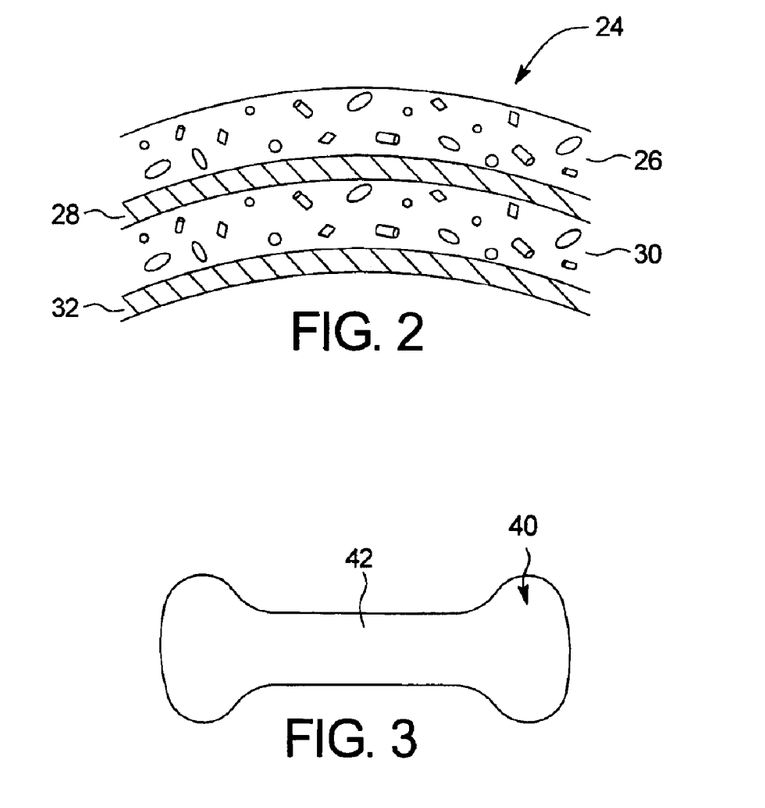
FIG. 2 illustrates a schematic view of tartar on the teeth of a dog as viewed under a scanning electron microscope.
FIG. 3 illustrates a perspective view of an embodiment of a product of the present invention.

Referring to FIG. 2, schematically there is illustrated a cross-sectional view of tartar 30 as viewed under a scanning electron microscope. As illustrated, the tartar comprises a number of inorganic layers 32 and 34 which have sandwiched therebetween proteinaceous layers 36 and 38. The inorganic layers 32 and 34 have a hard porous structure.

Referring now to FIG. 3, an embodiment of the product 40 of the present invention is illustrated. As illustrated, the product 40 provides an edible chewable product that enhances the dental hygiene of a pet animal. Although the product is illustrated in the shape of a bone, a variety of shapes can be used for product 40, e.g., a biscuit or a flat elongate generally rectangular body or any shape that would fit into an imaginary rectangular box and would touch each of the internal surfaces of such a box. Preferably, the corner extremities of the body would approximately generally coincide with the corners of the box.

Figure 4:
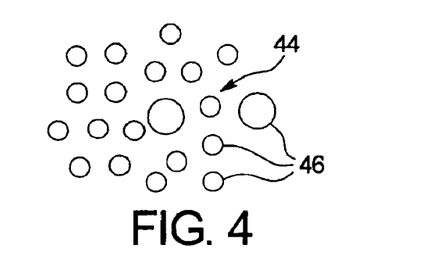
FIG. 4 illustrates schematically an embodiment of the structure of the present invention as viewed under a microscope.

The product 40 is designed to have a superior cleaning action due to its resistance to tooth penetration when chewed. To this end, the product 40 comprises a body 42 having a continuous phase and discontinuous phase. FIG. 4 illustrates schematically the continuous phase 44 and discontinuous phase 46 as viewed under a microscope. The phases 44 and 46 are carefully balanced to ensure optimum texture for cleaning of the surface of a pet's teeth.

The continuous phase 44 is preferably composed of an interlocking matrix of polymers. These polymers are further preferably of biological origin and can be derived from many different sources including products of, and by-products from, human food processing and derivatives thereof, animal sources, plant sources, products of and by-products of meat processing, products of and by-products common to the baking and cereal processing industries and derivatives thereof, milk and milk derivatives, microbial sources and from the microbial modification of products and by-products from the aforementioned sources, as well as a broad range of other well known sources of natural biopolymers. The continuous phase may also contain smaller solvating molecules, preservatives, anti-oxidants, crystallization retardants, inorganic ions, flavour molecules and other smaller compatible molecules and ions that do not have a negative impact on polymer interaction. These polymers of biological origin are held together/interact in a dynamic non-covalent manner by hydrogen bonding, ionic attraction, Van der Waals interactions and other forms of non-covalent bonding. This phase will normally be in a rubber-like state and will preferably pass through a glass transition point well below room temperature. It may also be preferable to have substances present in the continuous phase that can retard crystallization of the other components of the continuous phase.

In contrast to the continuous phase 44, the discontinuous phase 46 consists mainly of non-active ("inert") or low activity substances that will not extensively bind to the components of the continuous phase. However, there will be enough interaction between the phases to ensure that the discontinuous phase will remain part of the total structure and will not fall out of the enclosing matrix. The discontinuous phase may be a mixture of different substances with one or two dominant substances. It is possible that the discontinuous phase may even consist of some components of the continuous phase that are in a crystalline or glassy state.

A variety of components can be used for the discontinuous phase and include micro-occlusions/particles of virtually all non-reactive/insoluble organic/biological substances with melting points and/or glass transition points above room temperature, as well those with melting and/or glass transition points below room temperature that are not soluble in the continuous phase. Also possible are non-active inorganic substances such as mineral oxides, phosphates, carbonates and other insoluble salts or covalently bonded inorganic substances or mixtures/complexes and combinations of same.

Examples of substances, from which the discontinuous phase may be composed are: micro-occlusions/microscopic particles of all non-reactive/insoluble organic/biological substances with melting points and/or glass transition points above room temperature and as well those with melting and/or glass transition points below room temperature that are not soluble in the continuous phrase; occlusions/particles of all non-reactive/insoluble organic/biological substances with melting points and/or glass transition points above room temperature and as well those with melting and/or glass transition points below room temperature that are not soluble in the continuous phase; non-active inorganic substances that are compatible with and do not react or significantly interact with the substances present in the continuous phase; carbohydrates and/or derivatives of carbohydrates including saccharides, sugars, polysaccharides, starches and preferably ungelatinized starches, derivatives of starches, inulin, polyfructans, polydextrans; all polymers of naturally occurring hexose, pentose and heptose sugars and their derivatives; cellulose and polymers derived from cellulose; amino-polysaccharides such as chitin, chitosan and polymers derived from these substances; oligosaccharides, polysaccharides of and derivatives of polysaccharides of microbial origin; polyols, including polyols of microbial origin; sugar alcohols, polymers of sugar alcohols, mineral oxides, inorganic and organic oxides, phosphates, sulphates, carbonates; other insoluble salts or covalently bonded inorganic substances; polymers of or mixtures/complexes and combinations of all of the aforementioned inorganic and organic substances; aluminosilicates, silicates, inorganic substances common in soils, clays, minerals, metals and substances derived from the metals, bone, cartilage, oils, fats, gases, petroleum derivatives and petroleum based polymers; micro-occlusions/particles of microbial origin, intact non-viable microbes, dry intact non-viable microbes, the shells and cell wall material derived from dead microbes, material of microbial origin, micro-occlusions/particles of plant origin, material of plant origin, micro-occlusions/particles of animal origin, material of animal origin. Where a polymer in the discontinuous phase is of biological origin and is also found as a component of the continuous phase, it will be present in the discontinuous phase in a different state to its state in the continuous phase. Preferably it will therefore be present in the discontinuous phase in the glassy or crystalline state. Other polymers that are present should preferably be predominately in the glassy or crystalline state. However, there are embodiments in which the aforementioned polymers are predominately in the rubber state, in which they will exist as dispersed, relatively small and discrete particles.

It is desirable that, as illustrated, the discontinuous phase 46 at the microscopic level is relatively evenly dispersed throughout the continuous phase 44. This ensures minimum disruption to the continuity of this phase. The ratio of the materials present in the two phases can be manipulated to vary the resultant product to suit the desired application.

It should be noted that it is possible that at the macroscopic level there maybe additional gross occlusions in the product e.g. grains of cereal etc. These occlusions would be part of the discontinuous phase, but differ from the rest of the discontinuous phase in that their interior will possess its own unique combination of phases and molecules. Hence due to the gross size of the said occlusions, these can significantly and independently influence the resultant product characteristics. For a dental hygiene product for dogs, the preferred structure of the product 40 has no gross occlusions, as these could cause a significant disruption to the continuous phase and an undesirable increase in fragility of the product.

In a preferred embodiment, at least a portion of the polymer of the continuous phase is in the rubber state. This state is found to improve "chewability" of the product—i.e. the duration of chewing exhibited by a pet dog without the product body disintegrating significantly. In a more preferred embodiment, the rubber state proportion is in the main. By increasing the proportion of the continuous phase that is in the glass state, a harder product is produced and chew duration is increased. However, care needs to be taken to maintain the proportion that is in the glassy state at a level below which brittleness is increased to the extent that the product may easily shatter under biting. This would have potentially negative and even harmful consequences for the pet, for example by the liberation of sharp fragments. No more than a relatively minor proportion of the polymer of the continuous state should be crystalline, therefore.

In another preferred embodiment, the continuous phases should be free of components that interfere with the rubbery character of the biological polymer. Such substances include certain divalent cations. These may interfere with the flexible character of the body 40.

In preferred embodiments, the product 40 is composed of approximately 20% to about 40% by weight starch, approximately 20% to about 40% by weight protein, and 5% to about 40% of water. In farther preferred embodiments, the product is composed of approximately 20% to 31% by weight starch, 25% to 37% by weight protein and 15% to 20% by weight of water. Preferably, the starch acts as the primary component of and is evenly dispersed through the discontinuous phase and the protein acts as the primary component of the continuous phase.

Regarding phase weight distribution, it is preferred that the continuous phase should make up from about 20% to about 80% of the product weight, further preferably from about 25% to 60% of the total weight.

The product 40 is designed to have a texture suited to the bite force expected to exerted by a predetermined target group of pet animals. The texture of the material used to construct the product 40 is selected to ensure that the force required to penetrate the product is greater than the bite force exerted by the teeth of an average animal in the target group of animals during a normal biting event. In a preferred embodiment, however, the required penetration force is still below the maximum bite force typical of the said group of animals. At the same time, the elastic nature of the material of the product 40 is selected such that, after penetration, the material springs back. This creates a secondary cleaning action after the primary cleaning action experienced in attempting penetration. This action also helps to push back the edge of the gums and thus facilitates cleaning of the pet's teeth in difficult to reach areas.

The product is designed to have a durability that ensures that the product 40 remains in the mouth of the pet for an extended period of time. This thereby increases the opportunity for cleaning while the product 40 is being chewed. It also provides pet keepers with a ready means and method of keeping their pet occupied. Unlike prior art products, the product 40 will not quickly fracture into pieces that can be easily swallowed by the dog. Also unlike other prior art products, the product is safer for the pet as it is not hard and does not splinter into dangerous fragments that can lodge in the animal's throat.

If desired, the product 40 may include other active ingredients, for example agents that may inhibit the initial formation of tartar. The product 40 may alternatively or in addition comprise chelating and other agents that help soften tartar, and facilitate tartar's removal when abraded, such as when the product is chewed. Examples of such active agents are disclosed in U.S. patent application Ser. No. 60/279,998, the disclosure of which is incorporated herein by reference.

As noted above, the product 40 can have a variety of sizes and shapes. In a preferred embodiment of the invention that is illustrated, the body 42 is of a size and generally bone-like, flat shape that has been specially designed to fit easily in between the teeth and cheeks of targeted dogs. It will be appreciated that the different shapes may be preferred, depending on the targeted dogs and their mouth structure.

The shape typified above has been found optimum for beagles and other dogs with similar mouth structures. This shape has the advantage that dogs derive great pleasure in holding such a product between their front paws, first chewing on one side then on the other. This helps ensure improved cleaning for all teeth contained in the pet's mouth. In particular, the shape encourages the dog to concentrate the chewing action on the rear teeth, the teeth that are the most difficult to reach with a toothbrush and where tartar build up can be significant. The size may vary, influenced by the size of dog in the target market. In general, the length to breadth ratio will be in the range from about 2:1 to about 4:1. Preferably it will be approximately 3:1. The thickness should be generally about a third to a half of the maximum width.

Pursuant to the present invention, the product can have a wide range of textures. The texture alone is enough to ensure effective teeth cleaning. Nonetheless, fibrous and insoluble abrasive elements may be present in the product, but are not essential.

The product 40 can be designed to have an optimum chewability for most dogs. Pet dogs can have very powerful jaws and have been found to typically exert a biting force of between 100 newtons to about 400N with a median of 163N and average force of 256N. The texture of the product of the present invention is selected to ensure that the force required to penetrate the product 40 is greater than the bite force exerted by the teeth of an average dog in the target group of animals during a normal biting event (in other words the median force referred to above), and below the maximum force that a dog may periodically exert. Penetrometry studies showed that on the surface normally bitten, the preferred embodiments of the product of this invention typically required a force of approximately 225 newtons for penetration by a specially constructed "model tooth." Also, the penetration by this "model tooth" did not fracture the product as often happens with many of the more brittle prior art products.

Another surprising observation was that after penetration with and then withdrawal of a probe of 4 mm diameter, the hole partially reclosed to less than 2 mm diameter. Hence, when bitten by a dog, the elastic nature of the product 40 ensures that, after penetration, it actually springs back and pushes against the animal's tooth surface, thus ensuring intimate contact with the tooth surface and enhanced mechanical cleansing action.

The product 40 is very durable with many bites being required before the product 40 is of sufficient size to be swallowed. For example, it has been found that it takes between approximately 3.5 to about 12 minutes for a medium to large dog (having weight in the range from about 10 kg to 35 kg) to consume the product 40. The prolonged chewing that is required facilitates increased contact with the teeth and hence the effectiveness of the mechanical abrasive cleaning action in removing plaque, the precursor for tartar.

The product 40 of the present invention offers a number of benefits. These include: stronger, better quality products; means for inclusion of difficult ingredients that may otherwise compromise the product quality or strength and their delivery to the pet's teeth; cheaper products with obtainable without compromise to desired properties such as strength and flexibility, since decreased amounts of potentially expensive continuous phase material may be used without compromising the essential features of the product; and simplicity of production as the systems described make use of low pressures and can be combined with well known forming technologies.

A variety of methods may be used for manufacturing the product 40. One method includes the steps of mixing ingredient powders and liquids in a system that can exert, for a desired period and at the appropriate time, controlled mechanical shear and/or temperature to ensure that a desired transitory physical state for each phase is reached within the processing vessel. These states may be any one or a combination of the glassy, rubber, crystalline or intermediate states. Before it exits from the primary vessel, the material is thus processed in such a manner and to such an extent as to ensure that it exits in the main as a carefully balanced combination of a continuous phase and a discontinuous phase; and that the phases will have all the desirable characteristics mentioned above and be in the desired aforementioned physical states.

The preferred primary vessel for use in manufacturing the product 40 is an extruder. Preferred extruders are of the long barrel type. After leaving the extruder, the resultant material is then manipulated in such a manner to form a predetermined shape. The shape may be adapted to facilitate mechanical cleansing of a pet animal's teeth and be able to access difficult areas of the animal's mouth. This manipulation of the material may also be designed to enhance the desirable aspects of the physical state of the product 40, for example by promoting a molecular alignment that increases resistance to tooth penetration under the force of biting. The product 40 is then preferably stored carefully in such manner as to ensure that no normally encountered environmental influence can cause change in the states of its phases.

Since the combination of materials in the product phases have the potential to be spun, woven, molded and stretched into a film, they also have a wide range of other applications outside of pet dental hygiene. For example a common problem in the food and feed industry is contamination of the food product with metal, plastic and the like non-edible identity tags. Rendered animal materials are frequently contaminated with such metal identity tags that are used for animal/carcass identification. Tags can be made instead using the processes described herein. These animal tags will disappear during rendering and processing and be totally edible.

Another application of the present invention is with respect to the surgical implantation of splints or pins to fix broken bones. Currently such products are constructed from metal or plastic. After their implantation, a second operation is necessary to remove such pins. Pursuant to the present invention, artificial bones that are initially sterile, very strong and are slowly broken down by mammalian enzymes can be provided. The ingredients of the products can be selected to reduce the risk of an immune response, e.g., including a tropocollagen derivative, such as gelatine. Hence these are an attractive alternative to metal or plastic implants/pins.

Figure 5:
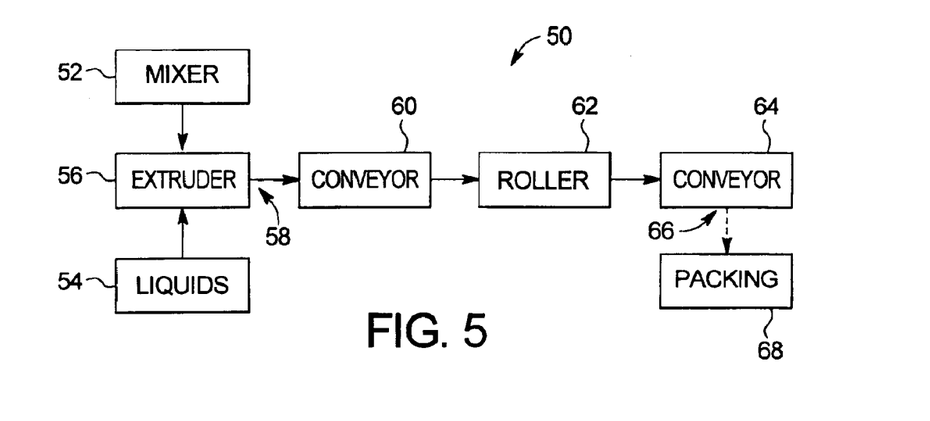
FIG. 5 illustrates schematically an embodiment of an apparatus for making a product of the present invention.

Referring again to the dental hygiene pet product 40 of the invention, it is composed principally of water, carbohydrate and protein. The product can be manufactured by a variety of processes involving mixing, cooking and forming. By way of example, and not limitation, the following manufacturing method can be used to manufacture products 40 of the present invention:

Referring to FIG. 5, a general embodiment of a manufacturing apparatus 50 for making a product of the present invention is illustrated schematically. First, dry ingredients are mixed in a mixer 52.

The dry mixture is added to the extruder 56, together with any desirable liquids 54, for example water, glycerol and oil or fat. The mixture is heated in the extruder 56 to a suitable cooking temperature with sufficient energy being input to cause it to enter a bioplastic state. The degree of heating and extent of cooking may be used as a means of controlling the ultimate density and texture of the resultant product. After cooking in the extruder 56, the product exits the extruder 56 as a high-density bioplastic fluid at relatively low temperature (about 75° C.–90° C.) with little expansion taking place at the die orifice 58.

Due to the fluid nature of the extrudate as a bioplastic, it can be easily formed into a vast range of shapes at low pressure, meaning at atmospheric or close to about atmospheric pressure. Accordingly, it is not necessary to mold the extrudate under relatively higher pressure, as in for example, injection or compression molding. The extrudate, being essentially a plastics material, can be readily drawn out into thin films, sheets, ropes, balls etc. The extrudate also emerges from the extruder in a microbiologically stable state, i.e., it does not need to be dried or treated to ensure microbiological safety. The extrudate merely needs to be cooled to room temperature. Cooling is best done gradually, as it is found that over rapid cooling creates steep thermal gradients and uncontrolled physical states within the product body so that uneven properties are exhibited. These are undesirable where they lead to stress cracks appearing.

Advantageous extruders for the method of the present invention are those referred to as long barrel high-speed twin screw extruders. They have smaller diameters and much tighter tolerances and work at higher screw speeds than their predecessors. Hence they can exert much greater torque under much better control than older style machines, providing high energy controlled input that brings the ingredient mixture to a bioplastic state and enables it to be maintained for sufficient residence time and under cooking conditions to facilitate desired texturisation. Preferably the ingredients are subjected to a specific mechanical energy of at least about 250 J/g.

The product exits the extruder through a die 58. The product then travels along conveyor 60.

In an embodiment, the product is then is passed through a biscuit gauge roller 62 from which emerges a flat sheet of material with very accurately controlled thickness and width and improved compression strength.

In an embodiment, this sheet again is conveyed along a conveyor 64 and it can be cut, for example with a biscuit rotary cutting apparatus 66, before proceeding to a packing station 68. It will be appreciated that alternatively, the sheet need not be passed through the roller 62, but may be sent directly to the cutting apparatus.

One alternative method of cutting is to cut the above mentioned sheet using a water jet cutter at station 66 in FIG. 5. Water jet cutters are typically used in the leather goods industry to cut leather sheets to produce the blanks for making shoes.

Because the material progresses through a broad range of physical states during processing—such as powder, rubber, glass, fluid and crystalline—a large number of forming processes is possible. The state is selected and controlled with a view to intended further processing. Other possible machines for processing the product include: confectionery equipment for handling toffees and hard sweets, e.g., depositing machines, chocolate molding systems, chain drive cutters for toffees, and blow molding machines, as the product is blowable into a thin, translucent film. Other possible machines include those typically used the biscuit industry for forming biscuits e.g. bar presses, wire cutting systems, etc and also those used elsewhere in the human food industry or plastics industry e.g. rotary formers etc.

The resultant product of the process set forth in FIG. 5 is resembles HDPE (high density polyethylene) in that it can easily be carved with a knife or sawn with an industrial jigsaw. However, for pet dental applications, it is found that the product should desirably have a non-cellular matrix and be of relatively high density. The preferred density range is from about 0.8 to 1.2 g.cm$^{-3}$. At densities that are too low, there are likely to be gas pockets that will reduce the bite resistance of the product. Excessively high densities will reduce flexibility and penetrability to unacceptable levels for pet dental applications.

It is important to note that the products of the invention may be extruded at low moistures compared to standard petfoods. Use of an extruder is desirable, as it can handle such mixtures and quickly bring them to the optimum temperature. It is thought that after introduction to the extruder, the mixture "melts" and becomes quite fluid.

A variety of products can be constructed pursuant to the present invention. For cats and dogs, preferred applications include dental chews, toys and confectionery. In the case of pet dental hygiene products, the Applicants have determined that the best texture for a dental hygiene product for dogs is a product with high density and a non-cellular matrix. It has been surprisingly found that it is possible to extrude these mixtures without any added water or steam. This is unusual as in the food industry almost all extrusion is carried out using added water, water-based solutions or steam. In the absence of added moisture, the inclusion of an humectant provides a degree of flexibility. The humectant may be any suitable humectant, for example, glycerin, propolyne glycol, butylene glycol, polyhydric glycols such as glycerol and sorbitol, hydrogenated starch, hydrolysates and the like. Low levels of water may, however, be included, even if only to act as plasticizer. In preferred embodiments, the sum of water and humectant in the final product is desirably in the range from about 15% to 45% by weight, but is more preferably from about 25% to 35% by weight.

By way of example, and not limitation, examples of products and methods of making same will now be given:

EXAMPLE 1

Five separate batches of product samples were made from the five mixtures of dry ingredients prepared according to the compositions shown in Table 1 and designated "1a" through "1e". Each batch of ingredients was in turn charged to a Sovemeca Mixer (Sovemeca Ltd, Vermand, France).

TABLE 1

| | Sample Number | | | | |
|---|---|---|---|---|---|
| Ingredient name | 1a Wt % | 1b Wt % | 1c Wt % | 1d Wt % | 1e Wt % |
| SODIUM CASEINATE* | 44.0 | 28.0 | 36.0 | | 48.0 |
| CORN STARCH | 38.82 | 39.0 | 48.0 | 39.0 | |
| LACTIC YEAST EXTRACT POWDER** | | 20.0 | | 20.0 | |
| SODIUM BENTONITE | | | 3.5 | | |
| MILK PROTEIN CO-PRECIPITATE*** | | | | 28.0 | |
| BROKEN RICE, GROUND | | | | | 39.0 |

TABLE 1-continued

| | Sample Number | | | | |
|---|---|---|---|---|---|
| Ingredient name | 1a Wt % | 1b Wt % | 1c Wt % | 1d Wt % | 1e Wt % |
| GELATIN 100 BLOOM**** | 14.0 | 10.0 | 8.0 | 10.0 | 10.0 |
| PRESERVATIVE - SORBIC ACID | 0.75 | 0.7 | 0.7 | 0.7 | 0.7 |
| NUTRIENT MIXTURE | 2.43 | 2.3 | 3.8 | 2.3 | 2.3 |
| Total | 100.00 | 100.00 | 100.00 | 100.00 | 100.00 |

*Supplied by Sodial Ltd, Montablan, France.
**Supplied by Bel Industries, Vendome, France.
***Supplied by Centre R. & D. Nestlé, Lisieux, France
****Supplied by Dutch Gelatine Ltd.

After mixing, each of the dry mixtures was metered directly into the inlet of a long barrel high-speed twin screw extruder via a K-tron weigh belt. Liquid humectant and plasticiser mixtures, being of water, glycerol and edible oil, were injected via peristaltic pumps, monitored by flow meters, with quantities being under automatic control by a PLC-based program. Approximately 1 part liquid mix was added to about 2.5 parts of solids by weight, the liquid mix comprising about 3 parts glycerol to one part water. After gentle cooking to a temperature of about 80° C. and to a pressure of about 4 atmospheres, the material emerged from the extruder via the die as a thin sheet, at low pressure of about 1.5 atmospheres and a temperature of about 77° C. After allowing each of the samples to cool to below about 65° C., all except sample 1d were next conveyed on a conveyor directly to a Rotary Biscuit cutter (Sasib Ltd, UK), with which they were cut to shape and size.

After cutting to bone-like shapes, the cut pieces were gradually air-cooled to room temperature to avoid over-stressing the product and packed into hermetically sealed sachets.

Sample 1d was made as above except that a modified extrusion method was employed in that the die used was approximately 1 metre in length and the product was shaped by cutting the extrudate with a water cutter, of the type typically used in the leather industry for fabricating shoes.

Table 2, below, sets forth an analysis of the resultant product samples.

TABLE 2

| Composition of manufactured samples | | | | | |
|---|---|---|---|---|---|
| Component | 1a Wt % | 1b Wt % | 1c Wt % | 1d Wt % | 1e Wt % |
| WATER | 17 | 16 | 15.5 | 19 | 16 |
| FAT | 0.8 | 1.1 | 0.6 | 1.1 | 0.8 |
| PROTEIN | 37 | 25.1 | 28.1 | 22 | 39.2 |
| STARCH* | 21.2 | 22.0 | 32 | 26 | 20.5 |
| CRUDE FIBRE | 0.1 | 4.0 | — | 3.8 | 0.1 |
| ASH | 2.7 | 3.5 | 5.2 | — | 3.2 |
| GLYCEROL | 15.4 | 14.0 | 15.8 | 18 | 16.5 |
| ORGANIC ACIDS | 1.2 | 1.0 | 0.9 | 1.1 | 1.1 |
| Approx. Weight % of Continuous Phase | 55 | 30 | 40 | 30 | 50 |

*estimated

Each of the products had a density of about 1 g.cm$^{-3}$ weight of about 50 g and, except for sample 1d, dimensions of length 12.5 cm, width about 4.2 cm and thickness about 1.2 cm. Sample 1d had a maximum width of about 3.6 cm and thickness of 1.4 cm.

The produce of sample 1a was found to comprise about 55% by weight of continuous phase and about 45% by weight of discontinuous phase material. The continuous phase appeared as a matrix with no readily distinguishable particle structure, as one might observe in the case of a material having discrete units. It was found to comprise an intimate mixture of caseinate protein and gelatin. The discontinuous phase appeared as discrete particulate units substantially evenly dispersed through out the product body. These were found to be made up of distinct, visible particles of ungelatinized starch, distinct particles of caseinate and gelatin in the crystalline/glass state. Particles of ash, probably emanating from the nutrient mix, and some of the sorbic acid preservative were also noticed as phase discontinuities. Similar observations were made in respect of the samples 1b through 1e, in which the relative phase distributions were influenced by the initial ingredient mix for each sample.

The texture of each sample was analyzed with a system designed to simulate the biting action of a dog's teeth. A TA-XT2I Texture analyser (Rheo Ltd, Champlan, France) was equipped with a specially designed cone-shaped penetrometry probe of length 12 mm, that was pushed slowly into the product, descending at a rate of 2 mm/s. Measurements were made of the force required. Unlike comparable edible pet chew products in the market, the products of the invention did not break when penetrated. A standard three point flexion test was also carried out using this machine. For sample 1a, it showed flexion through 20 mm without breaking (see Table 3 below).

TABLE 3

Texture Analysis: Product Samples 1a–1e

| Product Sample | Penetration force* $f_{max}$ (flat surface) [N] | Flexion Force $f_{max}$ [N] | Flexion Distance [mm] |
|---|---|---|---|
| 1a | 225** | 242 | 20** |
| 1b | 180** | 88 | 20** |
| 1c | 262** | 230 | 14 |
| 1d | 90** | 40 | 40** |
| 1e | 245 (10 mm) | 250 | 15 |

*For a 12 mm spindle to fully penetrate product
**Never broke

Sample 1d proved highly flexible in relation to the others and was only moderately resistant to penetration. Hence it was considered more suitable for fabrication of products for small dogs known to have a reduced bite force.

EXAMPLE NO. 2

Each day, over a period of 21 days, each member of a group (designated "Product 1") of 12 beagle dogs was individually fed one of the products made pursuant to Sample 1a in Example 1 above, in addition to a diet of a canned commercial pet food. The combined diet of chew product and canned food was designed to yield approximately 100% of the calculated daily metabolic energy (ME) requirements of the dog. The single daily chew product of sample 1a provided approximately 25% of the dog's daily ME needs.

A second group (designated "Control 1") of 12 beagle dogs was simultaneously fed on only the canned commercial pet food, providing 100% of their daily ME requirement. At the end of the period, both groups were assessed for the accumulation of tartar on their teeth.

Before commencement of the test, an oral examination had been conducted on each dog prior to selecting it for the trial. Dogs with known or observed dental/oral problems (e.g. severe periodontal disease, excessive number of missing teeth etc) were not included.

Each dog was put through preliminary screening to check its feeding behaviour. Prior scoring was done to assess how each of the dogs chewed a standard treat. They were grouped into blocks depending on their observed behaviour. The behaviour groupings were very fast chewers, moderate chewers and slow chewers.

Dogs were blocked for assignment to the diets on the basis of this chew score, age and sex. Diets were assigned randomly within blocks. The dogs were confined indoors to eat. For the group receiving the product, it was given in a bowl, 4 hours after the main meal, in the morning. The bowl was removed 1 hour after and the amount of treats not eaten was scored and measured. Eleven Dogs ate all of the product on every day of the test period. The twelfth dog ate its treat only partially on 3 out of 21 days.

Complete dental prophylaxis (ultrasonic cleaning and polishing) was performed on all dogs on the first day of the test period. On day 21, the dogs were sedated for a brief period of time (several minutes) to enable an evaluation of tartar buildup to be performed. The teeth were first gently brushed with a toothbrush, rinsed with a forced stream of water, then air-dried. The tartar was then visually recorded for the proximal, medial and distal thirds of the buccal surfaces of the teeth. The amount of the surface covered with tartar in a particular ⅓ segment was scored as 0=no plaque; 1=<25%; 2=25–49%; 3=50–74%; 4=75–100%. The thickness of the tartar was scored as 1=Light; 2=Moderate; 3=Heavy. Total score for one tooth was achieved by multiplying the thickness and coverage scores for each segment and summating the resultant values of the 3 segments.

The scores for all surfaces for each animal were added and divided by the number of teeth to provide each animal's individual score. A mean group score was obtained by averaging the scores of all the members of the group. A note was also made of the incidence of gingivitis on the adjacent gum line.

For further comparison purposes, the procedure of the set out above in this example was repeated in a separate set trial, with the exception that, instead of being fed the product of the present invention, the dogs in the original first group ("Product 1") were fed commercial dog biscuits in an equivalent quantity (i.e. at ~25% of dietary ME requirements). The results of this trial are reported in table 4 with the designation "Biscuit 2" for the group of dogs (formerly group "Product 1") receiving the commercial dog biscuit as a chew, and "Control 2" for the group receiving only commercial canned petfood.

The results in tables 4 and 5 show that the product of the present invention is significantly effective in reducing tartar on dogs' teeth when compared to the control and even to competing biscuits. It is especially effective in reducing the formation of tartar in the rear teeth when compared with the products claimed by their manufacturers to reduce tartar, such as the biscuit in the Biscuit 2 diet.

For the animals fed the "Product 1" diet, a small but significant reduction in the incidence of inflammation for the gum area adjacent to the rear teeth and in particular adjacent to premolar 3, the most commonly extracted tooth for many dog breeds, was observed.

TABLE 4

Mean Group Tartar Scores

| Diet | All Teeth | Primary Molars | Upper Jaw, PM3, PM4 & M1* | Front Teeth |
|---|---|---|---|---|
| Product 1 | 2.96 | 3.38 | 3.67 | 2.3 |
| Control 1 | 6.05 | 11.21 | 10.05 | 2.2 |
| Biscuit 2 | 3.97 | 3.78 | 6.30 | 3.15 |
| Control 2 | 5.84 | 7.30 | 9.23 | 3.46 |

*3rd Premolars; 4th premolars and first molars.

TABLE 5

Percentage Tartar Reduction when diet is supplemented with chew products

| Diet | All Teeth | Primary Molars | Upper Jaw, PM3, PM4 & M1* | Front Teeth |
|---|---|---|---|---|
| Product 1 | 51% | 70% | 63% | 0%** |
| Biscuit 2 | 32% | 48% | 32% | 0%** |

**No significant difference

EXAMPLE NO. 3

In a separate test, the digestibility of the product of this invention was tested. Eight adult beagle dogs (4 female, 4 male) in good health were individually housed and fed once a day with a test diet.

This test group was designated "Product ID" and the dogs were fed a test diet that was a combination of the product of this invention and a commercial canned petfood available under the trade name "Winalot" (Winalot is a trademark of Societédes Produits Nestlé, Vevey, Switzerland). These foods were the only the sole source of nutrition for the animals during the trial. The daily ration was calculated for each animal based on its daily metabolic energy (ME) requirement. This was calculated using the formula:

$$ME \text{ requirement} = 132 \times BW^{0.75}$$

The product was sent for analysis before the test started and analysed for moisture, protein, fat, ash, fiber and gross energy. The ME of the product was calculated using the formula:

$$ME \text{ of product} = (3.5 \times \% \text{ protein}) + (8.5 \times \% \text{ fat}) + (3.5 \times \% \text{ carbohydrate}).$$

The diet was a combination of the canned commercial petfood, at 75% of the daily metabolic energy requirement, and the product of this invention manufactured according to example 1, at 25% of the daily metabolic energy (NE) requirement. Fresh water was provided at all times.

Initially, all the dogs were fed for 5 days on the given diet. This allowed them to adapt to the diet. After 5 days, the weight of each dog was measured to calculate its ration for a stool collection phase to follow. During the collection phase, the dogs were continued on the same diet for a further 5 days, during which the feces were collected.

On the first day of this phase, each dog was given 1 g of iron oxide marker mixed into the food. This indicated the start of the fecal collection (The first feces collected were red). During the remaining 4 days the food was given as normal. The day after the finish of the 5 day collection phase period, red iron oxide was again given (1 g) mixed into the food to mark the end of the fecal collection. (These red feces were not collected).

Daily food intakes and fecal score were recorded. After daily collection of the feces, they were stored in a freezer at −20° C. The feces for each dog was pooled for the 5 day collection period (all feces up to the final red marker). The total wet weight of the feces was recorded. All dogs were reweighed at the end of the trial.

The feces were dried in a freeze dryer. The total quantity of feces was dried, after thorough mixing. The weight of the dried feces was recorded. The dried feces were ground and sent for analysis for moisture, protein, oil, ash and gross energy (GE).

The digestibility was calculated using standard AAFCO methodology, where:

Dry Matter Digestibility $$(DMD)\% = \frac{g \text{ of } DM \text{ consumed} - g \text{ of } DM \text{ in faeces}}{g \text{ of dry matter consumed}} \times 100$$

(where "g" represents mass in grams)

Protein Digestibility $$PD\% = \frac{g \text{ of protein consumed} - g \text{ of protein in faeces}}{g \text{ of protein consumed}} \times 100$$

Fat Digestibility $FD\% = \dfrac{g \text{ of fat consumed} - g \text{ of fat in faeces}}{g \text{ of fat consumed}} \times 100$ Energy Digestibility $$ED\% = \frac{\text{kcal of } GE \text{ consumed} - \text{kcal of } GE \text{ in faeces}}{\text{kcal of } GE \text{ consumed}} \times 100$$

Carbohydrate Digestibility (by difference), CD %=similar calculation to that for protein Ash Digestibility, AD %=similar calculation to that for protein ME of Product:

ME in kcal/g=[kcal of GE consumed−kcal of GE in feces−((g of protein consumed.−g of protein in feces.)×1.25)]/g of food consumed Results Recorded During Collection Week:

| | | Average | Range |
|---|---|---|---|
| Food Intake | g/day | 1110 | 941.0 to 1271.0 |
| | kcal/day | 1643 | 1392.7 to 1881.1 |
| BW Change | % | 0.22 | −3.35 to 3.42 |

| Stool Consistency | | Average | Dogs Contributing |
|---|---|---|---|
| Normal | %1 | 86 | 8 |
| Soft But Formed | %2 | 5 | 3 |
| Unformed | %3 | 9 | 3 |
| Puddle | %4 | 0 | 0 |

| | | Average | Range |
|---|---|---|---|
| Stool Score | | 1.23 | |
| Output - | g/day | 132.9 | 87.0 to 166.2 |
| | % moisture | 71.9 | 65.4 to 78.7 |
| | g def./1000 kcal ing. | 81.3 | 54.1 to 102.8 |

Analysis Results

|  |  | Average Nutrient Content | |
| --- | --- | --- | --- |
|  |  | Food | Feces |
| Moisture | % | 82.07 | 71.9 |
| Protein | % | 5.79 | 9.0 |
| Fat | % | 3.18 | 0.8 |
| Ash | % | 2.98 | 13.4 |
| Crude fiber | % | 0.20 | ** |
| Carbohydrate w/out CF | % | 5.78 | 4.82 |
| Gross Energy | kcal/100 g | 88.9 | 79.9 |

|  |  | Apparent Digestibility | |
| --- | --- | --- | --- |
|  |  | Average | Range |
| Dry Matter | % | 90.4 | 88.0 to 93.2 |
| Protein | % | 92.2 | 90.0 to 94.8 |
| Fat | % | 96.1 | 93.4 to 97.4 |
| Ash | % | 41.4 | 25.9 to 61.2 |
| Energy | % | 94.5 | 93.0 to 96.1 |
| Carbohydrates | % | 96.4 | 95.2 to 97.4 |
| Metabolisable Energy: |  | 1.48 | (kcal/g): |

NB. Carbohydrates value was calculated from the analysis results of the other nutrients.

Average intakes were satisfactory and sufficient to maintain bodyweight during the trial. Due to the high digestibility of the products the average actual daily intake was above the theoretical, namely 1643 kcal/day versus that normally observed for the canned pet food alone of 1030 kcal/day.

The fecal quality was satisfactory with 91% of the feces scored as acceptable. No liquid diarrhea was observed. The apparent digestibility of the products was high with average values of: 90.4% (dry matter), 92.2% (protein), 94.5% (energy) and 96.1% (fat).

The mixed diet of 75% canned commercial pet food (Winalot) and 25% of the product of this invention were as digestible, if not more so, than the canned commercial pet food (Winalot) when fed solely. The calculated ME from the digestibility results, corrected for urinary nitrogen loss was 1.48 kcal/g.

EXAMPLE NO. 4

In a separate test, ten dogs were provided with the product sample 1a of example 1. Their eating behavior was videotaped. The dogs ranged in size and species from French hunting dogs, through beagles to fox terriers. The product was offered directly to each dog. The dogs all took the product in their mouths then lay down on their stomachs and transferred the product to their front paws. All the dogs held the product with ease in a slightly inclined vertical manner, then started chewing. Careful observation showed that the product fitted snugly between their cheek and the molars and premolars.

For all, the primary chewing action was a munching with their back teeth. It was noticed that periodically the dogs would stop and move their paws slightly and then resume chewing. On 2 out of 3 occasions this resulted in the product reversing to the opposite side of the perpendicular, which meant the dog then resumed chewing on the opposite side of the mouth. When having finally gnawed down to the end piece, the dogs picked the product up with their front teeth, biting and chewing a number of times before swallowing the product. This behavior pattern was consistent for all dogs and was in contrast to that which was observed for a commercially available synthetic chew product, Denta Rask (available from Pedigree Masterfoods, Melton Mowbray, UK).

A similar trial was conducted with the same ten dogs whose behavior was again videotaped. This time, each dog was handed one Denta Rask, weighing 64 g. It was bigger than the product made according to example 1, which, in this trial, weighed 50 g. The Denta Rask was taken in its mouth by each dog, held in the jaws and cracked into pieces with the front teeth. The pieces were then taken and chewed.

Careful observation revealed that the dogs tend to chew Denta Rask more with the front and center of their mouth whilst periodically pausing to crack the product and break it into smaller pieces. The rear cheeks were seen to bulge less often with Rask. The dogs dropped more crumbs when chewing it. Also some dogs took substantially less time to chew Denta Rask. For the 50 g product of this invention, chewing times in excess of 12 minutes were observed for some beagles. In comparison, these dogs chewed a 65 g Denta Rask for about 5 minutes.

This demonstrates that the product of this invention was superior in encouraging dogs to masticate with their rear teeth than some the Denta Rask product of the prior art. It also shows that effective dental hygiene products can combine product design with appropriate chemistry and texture that results from properly controlled manufacturing methods.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A chewable product capable of enhancing dental hygiene in a pet, comprising a body having a continuous phase and a discontinuous phase that are so constructed and arranged that a force required to penetrate the chewable product is greater than an anticipated bite force expected to be exerted by the pet during a normal biting event wherein the discontinuous phase is composed of compositions meeting one of a criteria selected from the group consisting of: micro-occlusions/microscopic parties of all non-reactive/insoluble organic/biological substances with melting points and/or glass transition points above room temperature and as well those with melting and/or glass transition points below room temperature that are not soluble in the continuous phase;

occlusions/particles of all non-reactive/insoluble organic/biological substances with melting points and/or glass transition points above room temperature and as well those with melting and/or glass transition points below room temperature that are not soluble in the continuous phase;

non-active inorganic substances that are compatible with and do not react or significantly interact with the substances present in the continuous phase;

carbohydrates and/or derivatives of carbohydrates including saccharides, sugars, polysaccharides, starches; derivatives of starches, inulin, polyfructans, polydextrans;

polymers of naturally occurring hexose, pentose and heptose sugars and their derivatives;

cellulose and polymers derived from cellulose;

amino-polysaceharides and polymers derived from them;

oligiosaccharides, polysaceharides of and derivatives of polysaccharides of microbial origin;

polyols;

sugar alcohols, polymers of sugar alcohols, mineral oxides, inorganic and organic oxides, phosphates, sulphates, carbonates; other insoluble salts or covalently bonded inorganic substances;

polymers of or mixtures/complexes and combinations of all of the aforementioned inorganic and organic substances;

aluminosilicates, silicates, inorganic substances common in soils, clays, minerals, metals and substances derived from metals, bone, cartilage, oils, fats, gases, petroleum derivatives and petroleum based polymers;

micro-occlusions/particles of microbial origin, intact non-viable microbes, dry intact non-viable microbes, the shells and cell wall material derived from dead microbes, material of microbial origin, micro-occlusions/particles of plant origin, material of plant origin, micro-occlusions/particles of animal origin, material of animal origin;

such polymers and substances of biological origin as are present as components of both the continuous phase and the discontinuous phase, being present in the discontinuous phase in a different state to their state in the continuous phase.

2. The chewable product of claim 1 wherein the polymers and substances of biological origin are present in the discontinuous phase predominately in a glassy or crystalline state.

3. A method for making a chewable product for enhancing dental hygiene of a pet comprising the steps of:

producing a chewable, edible product that includes a continuous and a discontinuous phase; and selecting the relationship of the continuous to discontinuous phase so that the force required to penetrate the chewable product is greater than an anticipated bite force expected to be exerted by the pet during a normal biting event, enabling the chewable product after an initial bite, to spring back to at least almost its original shape wherein the discontinuous phase is composed of a composition that meets a criteria selected from the group consisting of: micro-occlusions/microscopic particles of all non-reactive/insoluble organic/biological substances with melting points and/or glass transition points above room temperature and as well those with melting and/or glass transition points below room temperature that are not soluble in the continuous phase, occlusions/particles of all non-reactive/insoluble organic/biological substances with melting points and/or glass transition points above room temperature and as well those with melting and/or glass transition points below room temperature that are not soluble in the continuous phase, non-active inorganic substances that are compatible with and do not react or significantly interact with the substances present in the continuous phase, carbohydrates and/or derivatives of carbohydrates including saccharides; sugars, polysaccharides, starches; derivatives of starches, inulin, polyfructans, polydextrans; polymers of the naturally occurring hexose, pentose and heptose sugars and their derivatives, cellulose and polymers derived from cellulose, amino-polysaccharides and polymers derived from them, oligiosaccharides, polysaccharides of and derivatives of polysaccharides of microbial origin, polyols, sugar alcohols, polymers of sugar alcohols, mineral oxides, inorganic and organic oxides, phosphates, sulphates, carbonates; other insoluble salts or covalently bonded inorganic substances; polymers of or mixtures/complexes and combinations of all of the aforementioned inorganic and organic substances, aluminosilicates, silicates, inorganic substances common in soils, clays, minerals, metals and substances derived from the metals, bone, cartilage, oils, fats, gases, petroleum derivatives and petroleum based polymers, micro-occlusions/particles of microbial origin, intact non-viable microbes, dry intact non-viable microbes, the shells and cell wall material derived from dead microbes, material of microbial origin, micro-occlusions/particles of plant origin, material of plant origin, micro-occlusions/particles of animal origin, material of animal origin; such polymers and substances of biological origin as are present as components of both the continuous phase and the discontinuous phase, being present in the discontinuous phase in a different state to their state in the continuous phase.

4. The method of claim 3 wherein the polymers and substances of biological origin that are also present as components of both the continuous phase and the discontinuous phase, are present in the discontinuous phase predominately in the glassy or crystalline state.

5. A chewable product capable of enhancing dental hygiene in a pet, comprising a body having a continuous phase including a biological material and a discontinuous phase that are so constructed and arranged that a force required to penetrate the chewable product is greater than an anticipated bite force expected to be exerted by the pet during a normal biting event wherein the discontinuous phase is composed of compositions meeting one of a criteria selected from the group consisting of: micro-occlusions/microscopic parties of all non-reactive/insoluble organic/biological substances with melting points and/or glass transition points above room temperature and as well those with melting and/or glass transition points below room temperature that are not soluble in the continuous phase;

occlusions/particles of all non-reactive/insoluble organic/biological substances with melting points and/or glass transition points above room temperature and as well those with melting and/or glass transition points below room temperature that are not soluble in the continuous phase;

non-active inorganic substances that are compatible with and do not react or significantly interact with the substances present in the continuous phase;

carbohydrates and/or derivatives of carbohydrates including saccharides, sugars, polysaccharides, starches; derivatives of starches, inulin, polyfructans, polydextrans;

polymers of naturally occurring hexose, pentose and heptose sugars and their derivatives;

cellulose and polymers derived from cellulose;

amino-polysaccharides and polymers derived from them;

oligiosaccharides, polysaccharides of and derivatives of polysaccharides of microbial origin;

polyols;

sugar alcohols, polymers of sugar alcohols, mineral oxides, inorganic and organic oxides, phosphates, sulphates, carbonates; other insoluble salts or covalently bonded inorganic substances;

polymers of or mixtures/complexes and combinations of all of the aforementioned inorganic and organic substances;

aluminosilicates, silicates, inorganic substances common in soils, clays, minerals, metals and substances derived from metals, bone, cartilage, oils, fats, gases, petroleum derivatives and petroleum based polymers;

micro-occlusions/particles of microbial origin, intact non-viable microbes, dry intact non-viable microbes, the shells and cell wall material derived from dead microbes, material of microbial origin, micro-occlusions/particles of plant origin, material of plant origin, micro-occlusions/particles of animal origin, material of animal origin;

such polymers and substances of biological origin as are present as components of both the continuous phase and the discontinuous phase, being present in the discontinuous phase in a different state to their state in the continuous phase.

6. The chewable product of claim 5 wherein the polymers and substances of biological origin are present in the discontinuous phase predominately in a glassy or crystalline state.

7. A method for making a chewable product for enhancing dental hygiene of a pet comprising the steps of:

producing a chewable, edible product that includes a continuous phase including a biological material and a discontinuous phase; and selecting the relationship of the continuous to discontinuous phase so that the force required to penetrate the chewable product is greater than an anticipated bite force expected to be exerted by the pet during a normal biting event, enabling the chewable product after an initial bite, to spring back to at least almost its original shape wherein the discontinuous phase is composed of a composition that meets a criteria selected from the group consisting of: micro-occlusions/microscopic particles of all non-reactive/insoluble organic/biological substances with melting points and/or glass transition points above room temperature and as well those with melting and/or glass transition points below room temperature that are not soluble in the continuous phase, occlusions/particles of all non-reactive/insoluble organic/biological substances with melting points and/or glass transition points above room temperature and as well those with melting and/or glass transition points below room temperature that are not soluble in the continuous phase, non-active inorganic substances that are compatible with and do not react or significantly interact with the substances present in the continuous phase, carbohydrates and/or derivatives of carbohydrates including saccharides; sugars, polysaccharides, starches; derivatives of starches, inulin, polyfructans, polydextrans; polymers of the naturally occurring hexose, pentose and heptose sugars and their derivatives, cellulose and polymers derived from cellulose, amino-polysaccharides and polymers derived from them, oligiosaccharides, polysaccharides of and derivatives of polysaccharides of microbial origin, polyols, sugar alcohols, polymers of sugar alcohols, mineral oxides, inorganic and organic oxides, phosphates, sulphates, carbonates; other insoluble salts or covalently bonded inorganic substances; polymers of or mixtures/complexes and combinations of all of the aforementioned inorganic and organic substances, aluminosilicates, silicates, inorganic substances common in soils, clays, minerals, metals and substances derived from the metals, bone, cartilage, oils, fats, gases, petroleum derivatives and petroleum based polymers, micro-occlusions/particles of microbial origin, intact non-viable microbes, dry intact non-viable microbes, the shells and cell wall material derived from dead microbes, material of microbial origin, micro-occlusions/particles of plant origin, material of plant origin, micro-occlusions/particles of animal origin, material of animal origin; such polymers and substances of biological origin as are present as components of both the continuous phase and the discontinuous phase, being present in the discontinuous phase in a different state to their state in the continuous phase.

8. The method of claim 7 wherein the polymers and substances of biological origin that are also present as components of both the continuous phase and the discontinuous phase, are present in the discontinuous phase predominately in the glassy or crystalline state.

* * * * *